Figure 1:
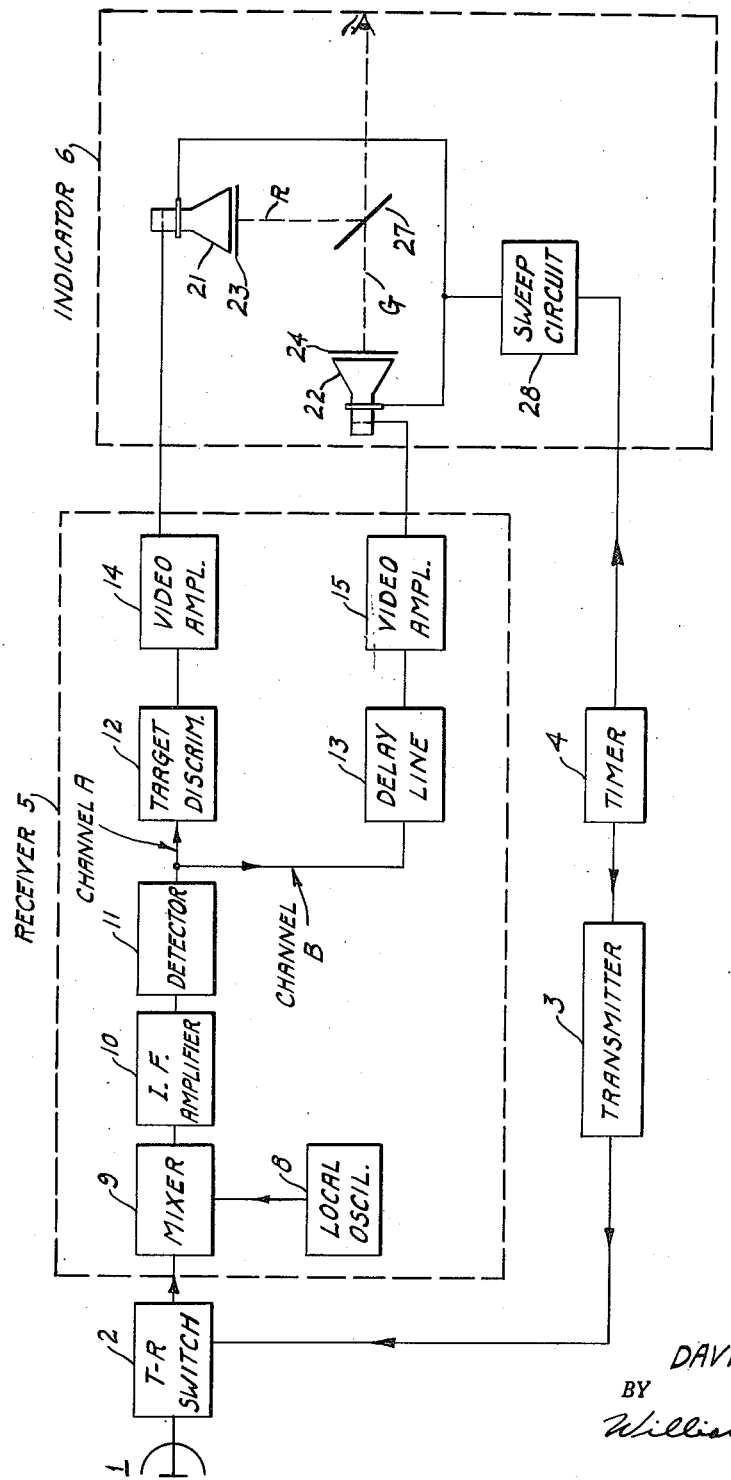

INVENTOR.
DAVID E. SUNSTEIN
BY
William E. Denk
AGENT

Aug. 7, 1956 D. E. SUNSTEIN 2,758,298
COLOR IDENTIFICATION IN RADAR SYSTEMS
Filed June 7, 1946 2 Sheets-Sheet 2
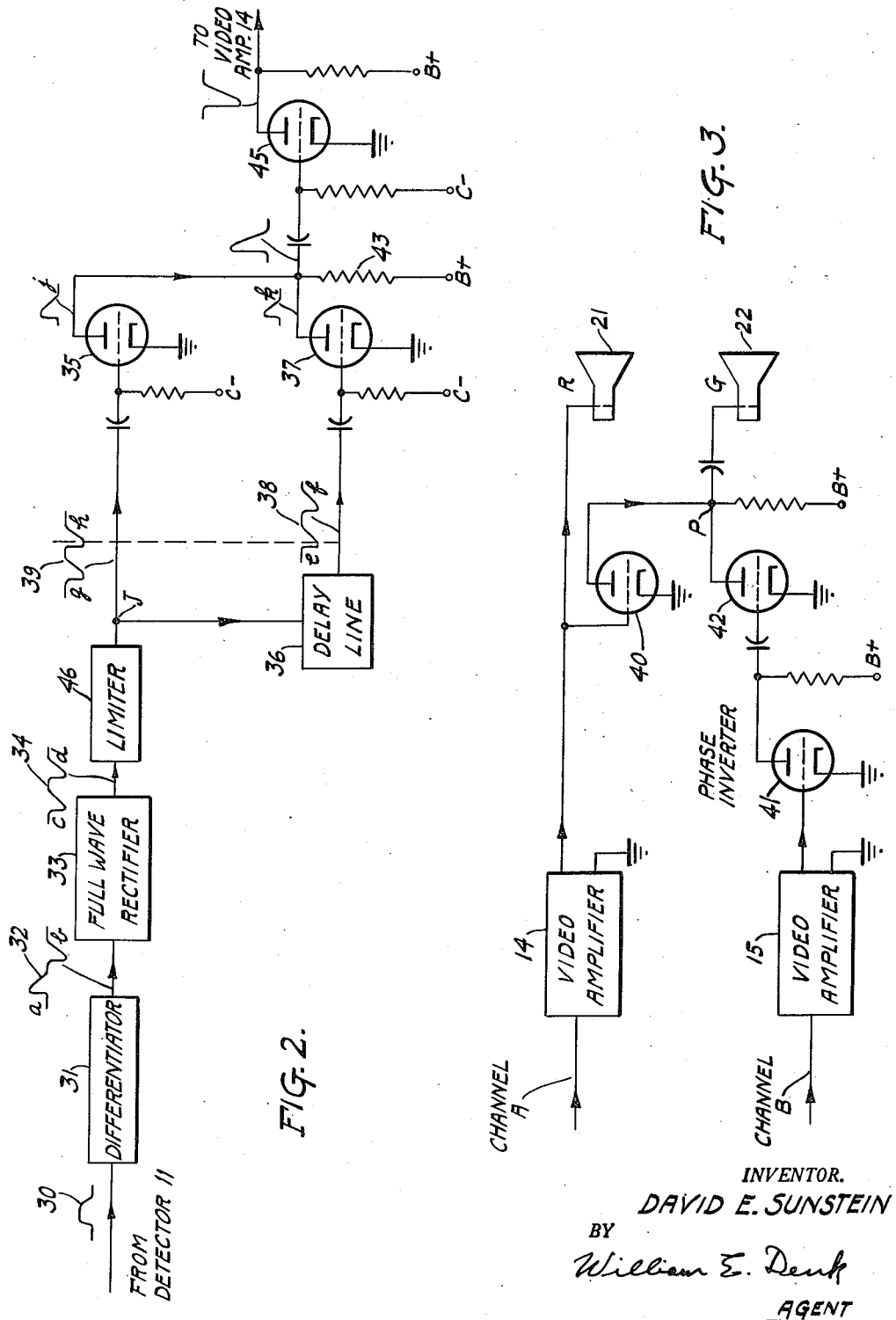
INVENTOR.
DAVID E. SUNSTEIN
BY
William E. Denk
AGENT

United States Patent Office 2,758,298
Patented Aug. 7, 1956

2,758,298

COLOR IDENTIFICATION IN RADAR SYSTEMS

David E. Sunstein, Cynwyd, Pa., assignor to Philco Corporation, Philadelphia, Pa., a corporation of Pennsylvania Application June 7, 1946, Serial No. 674,968

4 Claims. (Cl. 343—5)

This invention relates to improvements in radar systems and the like. By means of my improvements the legibility of the visual intelligence presented to the radar operator is very considerable increased, and the identity of remote objects may be determined with increased facility. The improvements are accomplished by employing color as an additional means for identifying remote objects and for distinguishing between target and the surrounding landmass or background.

For the purposes of this specification discrete objects such as buildings, motor vehicles, railroad trains, docks, ships, aircraft and the like are referred to as targets. Relatively large masses such as woodland, farmland, wasteland and land in general, are referred to as landmass. The broader term background is used in this specification to include sea as well as landmass.

It is frequently difficult in conventional radar systems for the operator to discern targets sharply and adequately. This is especially true where the target is situated upon and surrounded by landmass. The reflections from landmass, though ordinarily not as strong as the reflections from buildings and other targets, nevertheless tend to prevent and frequently do prevent sharp definition of the target by illuminating the cathode ray indicator in the vicinity of the target, thus reducing the visual contrast. This difficulty is not ordinarily experienced where the target is a ship surrounded by calm water since only a very small portion of the transmitted energy is reflected from a smooth water surface back to the radar receiver. But a choppy sea does reflect strongly from the inclined surface of the wave back to the radar receiver and the visual contrast on the radar indicator between ship and sea may be as unsatisfactory as between building and landmass.

Lack of adequate target contrast on a radar indicator tends to force the operator to adjust the gain controls in an effort to improve the condition; but turning down the intensity controls dims target as well as background, and turning up the control may merely saturate the screen in the vicinity of the target and fail to remedy the condition. Moreover, adjustment of controls may require time which the operator may not be able to afford, as for example, when adjustment is necessary in airborne radar in the course of a bombing run.

My invention comprises a novel combination of means which, in a preferred application, utilizes the fact that signals reflected from discrete objects, herein called targets, have the approximate duration of the transmitted pulse while signals reflected from the surrounding landmass or other background are of substantially longer duration. Or my combination may utilize the fact that signals reflected from targets are ordinarily of greater amplitude than signals reflected from landmass. Target signals are consequently distinguishable from other reflected signals and may be segregated therefrom. After segregating the target signals from the total reflections, as by means of a pulse length or pulse amplitude discriminator, I apply the target signals through suitable means to a visual indicator, such as a cathode ray tube having a screen of selected fluorescent material which under electron bombardment emits light of a certain preselected color. Or I may obtain the desired color by interposing a color filter in front of the fluorescent screen. All reflected signals, including target signals, or preferably all the reflected signals combined with inverted target signals, are applied through appropriate means to a second cathode ray tube having a screen of a different fluorescent material which under bombardment emits a light of a different, and preferably contrasting, color. Or the screen of the second tube may be of the same fluorescent material as that of the first tube, but have a different color filter interposed in front of it. The visual indications from the screen of each cathode ray tube are then combined, as by means effective to optically superpose one image upon the other. To the eye of the observer, the composite picture appears to have come from a single source and the target or targets are clearly identified by a color which contrasts with that of the landmass or background.

The above represents a preferred application of my inventive concept, the full scope thereof being set forth in the following objects of invention and in the claims.

It is an object of this invention to improve the legibility of the visual intelligence presented to the operator by the indicator of the radar receiver.

It is a more specific object of this invention to employ color in a radar receiver as an additional means of identifying remote objects and of emphasizing the distinction between a target and its surrounding landmass or background.

It is a further object to provide radar receiving means adapted to divide received signals into a plurality of categories in accordance with segregable distinctive qualities of said signals and to visually indicate the signals of the different categories in different colors.

It is a further specific object of this invention to provide means for segregating and visually presenting target-reflected pulses in a color which is different from that employed for presenting the background-reflected signals.

These and other objects, advantages and features of the present invention may be best understood from a consideration of the following specification and accompanying drawings, wherein Figure 1 is a diagrammatic representation of a radar system employing one embodiment of my invention;

Figure 2 is a block diagram of one form of pulse length discriminator which may be employed as a component of my novel radar system; and Figure 3 illustrates a form of signal voltage combining circuit which may be used with my system.

Referring now to Figure 1, there is shown in block diagram a radar system comprising the following major components: antenna system 1, T–R switch 2, transmitter 3, timer 4, receiver 5, and indicator 6. Most of these major components serve their usual and customary functions and only a brief explanation thereof is believed to be necessary.

Timer 4 produces the trigger pulse, establishes the pulse repetition rate, synchronizes the sweep action of indicator 6 to transmitter 3, and performs other actions of a synchronizing nature, all in known manner.

Transmitter 3 generates pulses of radio frequency energy whose duration and carrier frequency are determined by appropriate circuits in the transmitter.

The output of the transmitter is applied to antenna system 1 through T–R switch 2. T–R switch 2 operates in customary manner to couple transmitter 3 with antenna 1 and to decouple receiver 5 from said antenna during the transmission of each pulse. Immediately after the transmission of each pulse, the T–R switch reverses these conditions which then obtain for the period during which echoes or reflections are to be received.

Receiver 5, which is shown sub-divided into its various components, may be an ultra high frequency superheterodyne receiver and may include, among other things, a local oscillator 8, a crystal mixer 9, a multi-stage I.-F. amplifier 10, and a detector 11. If desired, the first few stages of the I.-F. amplifier may be in the form of a pre-amplifier whose sensitivity is increased according to the square of the elapsed time following the transmission of the pulse, thereby to compensate for varying distances to the various targets. Similar targets at different distances from the radar set are thus presented to the indicator at substantially equal voltages.

The later stages of the I.-F. amplifier 10 may, if desired, be so constructed and arranged as to provide an output signal which varies substantially logarithmically with the I.-F. input voltage. An amplifier circuit having the desired characteristics is described in my copending application filed June 11, 1946, Serial No. 675,-849, now Patent No. 2,705,794.

The video frequency output of detector 11 is applied to a circuit having two parallel branches, one of which, channel "A," includes a target discriminator 12 and video amplifier 14. The target discriminator permits only target signals to pass through as hereinafter more fully discussed. The other branch to which the output of detector 11 is applied is channel "B." This branch comprises a time delay line 13 followed by video amplifier 15. Through this branch flow all of the I.-F. amplifier output signals, i. e., background as well as target signals. The function of time delay line 13 is to introduce into the signals of channel "B" a delay equal to that introduced by target discriminator 12 so that the output of channel "B" will be in phase and correctly timed with respect to the output of channel "A." It will be understood that target discriminator 12 will generally have a small time delay inherently therein.

The target discriminator 12 shown in Figure 1 may be a pulse amplitude discriminator but is preferably a pulse length discriminator arranged to pass signals derived from input pulse signals whose duration is equal to, or within say 25 per cent of, the duration of the transmitted pulse. Input pulses of the selected duration may or may not be superposed upon a broader return pulse; the pulse length discriminator delivers an output in either case. But input signals whose duration is outside the established limits are sufficiently attenuated by the discriminator to be considered effectively suppressed.

A representation of a known form of pulse length discriminator which is suitable for use with the present invention is shown in Figure 2. Referring to that figure, a video pulse 30 derived from detector 11 is applied to differentiator 31. For purposes of illustration, pulse 30 is assumed to be positive, and the form of the differentiated pulse is shown by the wave form representation 32. It will be observed that the leading edge of pulse 30 forms a unit pulse or pip or spike $a$ of the same polarity as pulse 30 whereas the trailing edge forms a unit pulse or spike $b$ of opposite polarity. In passing through full wave rectifier 33, the wave form is changed to that shown by representation 34, i. e., the positive pip or spike $32a$ is converted to a negative spike $34c$ so that the wave now comprises two time-spaced negative spikes $c$ and $d$. The time interval between spikes $c$ and $d$ is of course equal to the time duration of applied pulse 30. After passing through limiter 46, wave 34 is applied directly to the grid of tube 35, and is also applied, through delay line 36, to the grid of tube 37. For convenience of reference, wave 34 is identified on the grid side of junction J by reference numeral 39, while the output of delay line 36 is identified by reference numeral 38. Delay line 36 is of conventional construction and is arranged to introduce a time delay equal to the duration of the transmitted pulse.

It will be seen that if incoming pulse 30 is of approximately the same time duration as the time delay introduced by circuit 36, then the leading spike $38e$ delivered by circuit 36 will reach the grid of tube 37 at the same instant of time that the trailing spike $39h$ reaches the grid of tube 35. The output voltages of tubes 35 and 37, represented by pips $j$ and $k$, are combined and appear across load resistor 43.

Tube 45 is biased beyond cut-off by an amount which is greater than the maximum amplitude of either of pips $j$ or $k$ alone, but is less than the sum of the two amplitudes. It will be understood that the maximum amplitude of the pips is determined by limiter 46. Tube 45 is consequently arranged to deliver zero output unless the voltage applied to its grid is within say 25 per cent of being equal to the sum of the magnitudes of spikes $j$ and $k$. This will occur whenever tube 35 delivers a voltage pip at approximately the same instant of time that tube 37 delivers a pip.

It will be seen from the description given above that voltage pips will be delivered simultaneously by tubes 35 and 37 whenever the duration of incoming pulse 30 is substantially equal to, or is within a preselected percentage of being equal to, the time delay introduced by circuit 36; and the time delay introduced by circuit 36 is arranged to be equal to the duration of the transmitted pulse. Tube 45 therefore delivers target signals only, and effectively suppresses all others.

Referring again to Figure 1, the output of target discriminator 12 is applied to video amplifier 14 and the output of delay line 13 is applied to video amplifier 15. Each of these amplifiers may preferably be provided with individual gain or contrast controls (not shown) so that the relative strength of target information with respect to background information may be varied as desired. Either, or both, of these amplifiers may be omitted if the strength of the signals delivered by the target discriminator 12 and/or delay line 13 is adequate without further amplification.

The output signals of video amplifiers 14 and 15 may, as shown in Figure 1, be applied directly to indicator 6. Indicator 6 is comprised of cathode ray tubes 21 and 22, a semi-transparent mirror 27, sweep circuit 28, and the usual blanking circuit (not shown). The output of video amplifier 14 containing target information only may be impressed upon cathode ray tube 21. The output of video amplifier 15 containing both background and target information may be impressed upon cathode ray tube 22. The screen of each of these tubes is dark except when illuminated by electron bombardment, as when the grid is impressed with an incoming signal of proper polarity. The fluorescent material comprising the screen of tube 21 is preferably different from the material comprising the screen of tube 22. Or the screens may be made of the same fluorescent material and different color filters 23 and 24 placed in front of each screen. Under electron bombardment, the screen of tube 21 becomes illuminated in color R while the screen of cathode ray tube 22 is illuminated in color G. Colors R and G are preferably contrasting. The visual intelligence of screen 21 is optically superposed upon that of screen 22 to produce a composite picture in which targets illuminated in color Y (that is, $R+G$) are defined upon a background illuminated in color G.

Optical superposition of the images of tubes 21 and 22 upon each other may be accomplished by any suitable system. In Figure 1, cathode ray tubes 21 and 22 are placed at right angles to each other equi-distant from mirror element 27 which is placed at an angle of 45° to the axes. Element 27 may be a lightly silvered semi-transparent mirror adapted to partially transmit and partially reflect light.

It will be observed that by the methods and means described above, assuming screens of different fluorescent materials, target signals are caused to appear in the composite picture in a color which is a blend between the screen color of tube 21 and the screen color of tube 22, the background being illuminated in the color of the screen of tube 22.

In the present specification, and in the claims, the term color is used broadly to include the spectral colors, or any combination thereof, including white. The color white is particularly useful in the presentation of the background information if combined with means for presenting the target information in one of the more arresting spectral colors, such as red. The use of white in combination with one of the other colors has the further, sometimes advantageous, feature that the combination of white and another color does not give rise to a third and different color. Thus the combination of red and white produces a red differing only in hue from the original.

Still greater contrast between target and background is obtainable by means about to be described. This may be accomplished by combining the landmass and target signals of channel B with inverted target signals of channel A so that the presence of targets will cause or tend to cause the screen of tube 22 to be dark in the target areas and illuminated only with background information. Consequently, when the illuminated target information in color R on the screen of tube 21 is superposed upon the illuminated background information in color G on the screen of tube 22, no dilution of target color occurs, and the targets are sharply defined in color R against a background illuminated in color G. Absence of landmass and targets cause, as before, a dark unilluminated indication.

Means for accomplishing the foregoing is illustrated in Figure 3. In that figure the signals delivered by video amplifier 14 are assumed to be of the same phase polarity as those delivered by video amplifier 15.

Signals of amplifier 14 containing target information only are applied directly to cathode ray tube 21 and also to the grid of tube 40. The signals of amplifier 15 containing both background and target information are applied to a phase inverter tube 41, the output of which is applied to the grid of tube 42. In passing through tubes 40 and 42, the respective signals are, of course, phase inverted. It will be seen that tubes 40 and 42 form a signal voltage combining circuit and that the inverted target signals from amplifier 14 are combined at point "P" with the twice-inverted background and target signals from amplifier 15. The total voltages applied to cathode ray tube 22 therefore consist of the difference between the absolute magnitudes of the target voltages 14 and 15 plus the landmass or background voltages of amplifier 15. If the target voltages of each amplifier be substantially of equal magnitude or if the target voltages of amplifier 14 (channel A) be greater than those of amplifier 15 (channel B) the target areas on the screen of tube 22 will be dark. The gain or contrast controls of the amplifiers are preferably so adjusted that the target output voltages of amplifier 14 are larger than the target output voltages of amplifier 15. The gain of the phase inverter stage 41 is preferably unity. Thus, to the observer, targets appear in color R, and landmass or background in color G.

In the methods described above, the screens of both cathode ray tubes are normally dark, i. e., unilluminated in the absence of incoming signal voltages. If desired, the circuits may be so arranged that both screens are normally illuminated and the received signals employed to darken areas of the screens. For example, if the screen of tube 21 be color R and the screen of tube 22 be color G, then in the absence of incoming signals, the composite picture appears to the observer to be illuminated in color Y ($Y=R+G$). The amplifier circuit may be so arranged that received target signals may be applied to the grid of tube 21 in negative polarity. These signals will darken areas of the R color screen. The target areas will consequently appear in the composite picture illuminated in color G, assuming zero or positive target signal is applied to tube 22. The latter may be readily accomplished, as by combining negative target signals from branch "B" with inverted, i. e., positive, target signals of equal or greater magnitude from branch A and applying the resultant target voltages to the grid of tube 22. The combining means may be similar to that shown in Figure 3. Negative landmass or background voltages of branch B applied to a normally illuminated tube 22 have the effect of darkening the landmass or background areas, and these areas will therefore appear in the composite picture illuminated in color R. It will be seen that by the foregoing method, targets appear in color G of the screen of tube 22, landmass or background appear in color R of the screen of tube 21, and absence of target or landmass shows up in color Y ($Y=R+G$).

If desired, the circuit may be so arranged that the screen of tube 21 is normally dark in the absence of incoming signals while the screen of tube 22 is normally illuminated in color G. Positive target signals from branch A applied to tube 21 illuminate the target areas in color R. Negative landmass and negative target signals from branch B applied to tube 22 darken the landmass and target areas on that screen. To the observer, the composite picture is illuminated with color R targets upon a dark landmass. Absence of both target and landmass, as for example calm water, appears in color G.

The target and landmass signals may be added together in a number of combinations other than those described above; I have merely described the preferred forms.

It will be seen that I have described radar receiving means which comprises the combination of means for classifying and segregating incoming signals into a plurality of groups according to distinguishing characteristics thereof, together with means for translating the signals of the different groups into visual indications of different colors. I have specifically described means which employs differences in pulse length as the distinguishing characteristic or basis for segregation, but it should be understood that my invention contemplates presentation in color code of segregable signals broadly, and that the segregation may be effected by employing any distinctive quality of the received signals which is capable of forming a basis for segregation. For example, the segregation may be based upon the direction and/or elevation from which the signals are being received, or may be determined by the polarization of such signals, or by the carrier frequency thereof as is disclosed and described in my co-pending application filed June 7, 1946, Serial No. 674,969.

Various other modifications within the breadth of my invention as defined in the claims will occur to those skilled in the art.

Having described and illustrated my invention, I claim:

1. In a radar system, means for transmitting time-spaced pulse signals of substantially uniform pulse duration, means for receiving reflected pulse signals, said receiving means including means for segregating said received signals into a plurality of different groups in accordance with differences in the pulse durations of said signals, means for translating the signals of the different groups into visual indications of different colors and means for superposing said different visual indications upon each other.

2. In a radar system having a transmitter of time-spaced pulse signals of substantially fixed duration and a receiver of reflected pulse signals, pulse length discriminating means for selecting received pulse signals having predetermined pulse duration, means for presenting said selected signals upon a visual indicator in preselected color, means for presenting all received signals upon a second visual indicator in a different color, and means for optically superposing one of said visual indications upon the other, 3. In a radar system having a transmitter of time-spaced pulse signals of substantially fixed duration and a receiver of reflected pulse signals, pulse length discriminating means included in said receiver for selecting reflected pulse signals having substantially the same duration as the transmitted pulse, said selected signals being reflections from discrete objects, means for visually presenting indications of said object-reflected pulse signals in a preselected color, and means for visually presenting indications of other reflected signals in a different color.

4. In a radar system having a transmitter of time-spaced pulse signals of substantially fixed predetermined duration and a receiver of reflected pulse signals, pulse length discriminating means incorporated into said receiver for selecting reflected pulse signals having a duration substantially equal to that of the transmitted pulse signals, said selected signals being reflections from discrete objects, means for visually presenting said object-reflected pulse signals upon an indicator in a preselected color, means for visually presenting other reflected signals upon a second indicator in a contrasting color, and means for optically superposing one indication upon the other to form a composite picture.

References Cited in the file of this patent

UNITED STATES PATENTS

| | | |
|---|---|---|
| 2,253,292 | Goldsmith | Aug. 19, 1941 |
| 2,335,180 | Goldsmith | Nov. 23, 1943 |
| 2,408,050 | De Rosa | Sept. 24, 1946 |
| 2,408,415 | Donaldson | Oct. 1, 1946 |
| 2,409,456 | Tolson | Oct. 15, 1946 |
| 2,412,669 | Bedford | Dec. 17, 1946 |
| 2,428,351 | Ayres | Oct. 7, 1947 |